United States Patent [19]

Broddevall

[11] 3,990,969

[45] Nov. 9, 1976

[54] PURIFICATION OF WASTE WATER FROM SULPHATE PULP BLEACHING PLANTS

[75] Inventor: Bengt Gunnar Broddevall, Skoghall, Sweden

[73] Assignee: Uddehoms Aktiebolag, Skoghall, Sweden

[22] Filed: Apr. 22, 1975

[21] Appl. No.: 570,409

Related U.S. Application Data

[63] Continuation of Ser. No. 403,048, Oct. 3, 1973, abandoned.

[30] Foreign Application Priority Data

Oct. 4, 1972 Sweden.............................. 12772/72

[52] U.S. Cl................................. 210/27; 210/28; 210/32; 210/51; 162/30 R; 162/DIG. 8
[51] Int. Cl.²........................................ C02B 1/52
[58] Field of Search ................... 210/24, 27, 28, 37, 210/30, 39, 32, 51, 52, 49, 53, 47; 162/16, 29, 30, 45, DIG. 8

[56] References Cited

UNITED STATES PATENTS

| | | | |
|---|---|---|---|
| 1,859,888 | 5/1932 | Richter................................. | 162/16 |
| 3,428,520 | 2/1969 | Yiannos............................... | 162/16 |
| 3,652,407 | 3/1972 | Paleos................................... | 210/30 |
| R24,213 | 9/1956 | Van Blaricom et al............... | 162/16 |

FOREIGN PATENTS OR APPLICATIONS 589,807   12/1959   Canada.......................... 162/DIG. 8

OTHER PUBLICATIONS

Rohm & Haas Technical Bulletin; "Decolorization of Kraft Pulp Bleaching Effluents Using Amberlite XAD-8 Polymeric Adsorbent", 8/71.

*Primary Examiner*—Charles N. Hart
*Assistant Examiner*—Benoit Castel
*Attorney, Agent, or Firm*—Cushman, Darby & Cushman

[57] ABSTRACT

A process for decoloring an aqueous effluent from the bleaching of sulphate pulp with chlorine or chlorine containing compounds, said effluent containing dark colored lignin degradation products, said bleaching including at least one alkali extraction stage, comprises a. treating the aqueous effluent from at least one alkali extraction stage in the bleaching with at least one acid selected from the group consisting of sulphuric acid, sulphurous acid and hydrochloric acid until a precipitate forms, said precipitate consisting essentially of dark colored lignin degradation products and other organic material b. separating the treated aqueous effluent from the precipitate and c. contacting the treated aqueous effluent which has been separated from the precipitate with a phenolic resin which is activated by the acidic effluent, said activated resin binding the dark colored lignin degradation products and separating a decolored effluent from the loaded resin.

11 Claims, 1 Drawing Figure

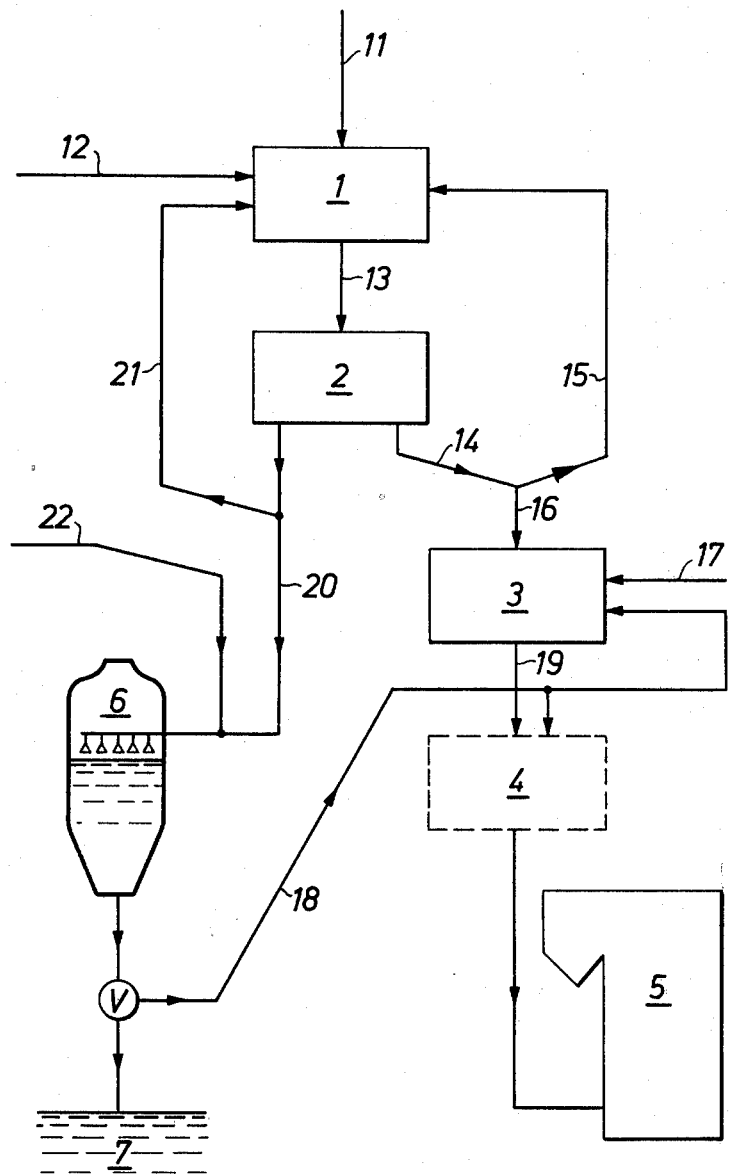

PURIFICATION OF WASTE WATER FROM SULPHATE PULP BLEACHING PLANTS

This is a continuation, of application Ser. No. 403,048 filed Oct. 3, 1973, now abandoned in favor of the present application.

The present invention relates to a method of purifying the aqueous effluent arising from the bleaching of sulphate pulp with chlorine or chlorine containing compounds. It is generally recognized that sulphate pulp bleaching plants using chlorine and/or chlorine compounds (usually $Cl_2$, NaClO, $ClO_2$) bring about a first-class product. It is therefore desirable to be able to continue to utilize existing bleaching plants, of this type, particularly if in good condition, because plants of this kind represent great capital cost. However, these conventional bleaching plants create a seriously polluted aqueous effluent. This effluent, particularly that arising from the first alkali extraction step, is very dark in colour and contains a high concentration of pollutants which are essentially dark coloured lignin degradation products. In spite of the fact that the conventional bleaching technique has considerable economical as well as technical merits, environmental reasons urge the replacement of existing bleaching plants with new plants which are not based on the use of chlorine.

It is a first object of the present invention to purify the aqueous effluent from conventional, i.e. on chlorine based sulphate pulp mills and so as to make it possible to retain these plants without modifying the bleaching process.

It is already known that a modification of the bleaching process can reduce the content of polluting agents in the aqueous effluent. A step in that direction is the introduction of the oxygen bleaching technique. If a fully bleached first class sulphate pulp is to be produced, the oxygen bleaching, however, must be finished with one or more bleaching steps based on chlorine, which creates a polluted effluent of a similar kind to that arising in the case of conventional bleaching plants. A further object of the present invention therefore is to make it possible essentially to eliminate such pollution.

U.S. Pat. No. 3,652,407 describes a method of purifying bleaching plant waste water. The first stage in this purifying process consists in a partial precipitation of the contaminants using lime. After separation of the precipitate, the remaining water is further purified by means of a substantially non-ionogenic macroreticular adsorbent resin, for example a synthetic insoluble cross linked polystyrene polymer or resin. The method has an obvious drawback, namely the difficulty of disposing of the precipitate. To dump on land such great quantities is quite impossible and the lime therefore must be recirculated to the sulphate pulp mill. This, however, involves great practical problems and a great risk of disturbances in the recovery system of the sulphate pulp mill.

An object of the present invention therefore is to precipitate the main content of the contaminants in such a way that the precipitate can be recirculating to the sulphate pulp process without disturbing the recovery system. A further object of the invention is to reduce the consumption of chemicals in the purification which is achieved by integrating the steps of the purification process with one another and with the chemical cycle of the sulphate pulp mill.

The present invention provides a process for decolouring an aqueous effluent from the bleaching of sulphate pulp with chlorine or chlorine containing compounds, said effluent containing dark coloured lignin degradation products, said bleaching including at least one alkali extraction stage, which comprises a. treating the aqueous effluent from at least one alkali extraction stage in the bleaching with at least one acid selected from the group consisting of sulphuric acid, sulphurous acid and hydrochloric acid until a precipitate forms, said precipitate consisting essentially of dark coloured lignin degradation products and other organic material, b. separating the treated aqueous effluent from the precipitate and c. contacting the treated aqueous effluent which has been separated from the precipitate with a phenolic resin which is activated by the acidic effluent, said activated resin binding the dark coloured lignin degradation products, and separating a decoloured effluent from the loaded resin.

In order to reduce the chemical consumption the purification is normally concentrated only on that bleaching stage which has been shown to contain the main portion of the total impurities from the bleaching plant, namely the first alkali extraction stage, but other aqueous effluents arising from the bleaching plant can also be treated.

The precipitate arising from acid treatment step (a) is conveniently disposed of by dissolving it in alkali, and the black liquor produced in the paper making process can be used for this purpose, and at least part of the resulting solution recycled to the sulphate pulp process. When the ability of the resin to take up further pollutants becomes reduced, the loaded resin may be regenerated by eluting it with alkali to give an eluate containing dark coloured lignin degradation products not precipitated in acid treatment step (a) and at least part of this eluate can be recycled to the sulphate pulp process.

The invention now will be explained more in detail with reference to the accompanying drawing which shows a flow diagram for a preferred embodiment of the process according to the invention.

Referring to the figure, that part of the paper making plant with which the present invention is concerned comprises essentially a precipitator 1, a separator 2, a precipitate dissolver 3 (which can be integrated with separator 2), an optional evaporator 4, a black liquor recovering unit 5, resin column 6 and receiver 7. The various units are fed and interconnected as described below.

The aqueous effluent from the first alkali extraction step from the sulphate pulp mill bleaching plant is fed into vessel 1 through conduit 11 and acid is added through the conduit 12 so that lignin degradation products in the water are precipitated. In the precipitation, sulphuric acid can be used, for example in the form of residual acid from the production of $ClO_2$ ($H_2SO_4$ - solution). Other strong acids which can be used include hydrochloric acid, which can preferably be in the form of concentrated solutions from acid bleaching steps in the pulp bleaching plant, or sulphurous acid e.g. as $SO_2$-water together with a salt, for instance $Na_2SO_4$. The acid quantity which is necessary for precipitation to occur depends on the concentration of lignin degradation products in the water. If the concentration is high a lesser quantity of acid is required and vice versa. In order to reduce the acid demand, it is possible to recycle a certain quantity of lignin degradation products which have already been precipitated and separated from the water (through the conduit 15). Another way of adjusting the pH/lignin degradation products ratio to a value which is suitable for precipitation to occur, is to recycle an acid water containing some lignin degradation products.

The necessary reduction of the pH-value essentially depends on the concentration of lignin degradation products in the water but it is expected that the pH-value normally should be reduced to pH 2 or below in order to precipitate the lignin degradation products in the bleach plant effluent effectively.

In order to stimulate the precipitation, it is possible to add known flocking agents which can bring about precipitation even if the pH is as high as pH 3.

In unit 1, the water is retained at least for a time sufficient for more than 50% of the lignin degradation products to be precipitated, and the water together with the precipitate is then fed through conduit 13 to the separator 2. Separator 2 can be of any kind known in the art, for example a sedimentation-, flotation and/or filtration plant. Preferably, however, it is a centrifugal separator, which separates the heavier precipitated fraction, which is drawn off through the conduit 14. A portion of the precipitate which has the form of a viscous resin or a paste can optionally be fed back through the conduit 15 for adjustment of the lignin concentration in the waste water prior to precipitation as mentioned above. The main portion, however, is fed through the conduit 16 to dissolver 3. Alkali is also fed to dissolver 3 through the conduits 17 and/or 18 so that the precipitate is redissolved. For this purpose, just a small addition of alkali is sufficient. The alkali can consist of eluate from the continued purification of the water (through the conduit 18); of white-liquor or black-liquor or soda solution from the production of the sulphate pulp; of ammonia, sodium hydroxide, magnesium hydroxide etc. Combinations of different alkali solutions can also be used and the use of such mixtures for example a combination of eluate and black liquor, can be advantageous. In the flow diagram, separator 2 and dissolver 3 have been shown as two separate units. It is however possible to integrate these two units. Thus in a centrifugal separator, the alkali may be introduced directly into the sludge room of the separator, where it quickly will dissolve the centrifuged precipitate and prevent the separator from being filled with a sticky paste.

From separator 2, the dissolved precipitate is fed via conduit 19 to evaporate 4. It can also be fed directly to recovery unit 5, or to any other destruction plant within the sulphate pulp mill. It is also possible to feed a portion of it or all of it to a unit for the production of a cooking acid in a sulphite pulp mill or to the causticising plant in the sulphate pulp mill. It is possible to use the lignin containing sludge as fertiliser.

As a result of the precipitation and the separation of the precipitate, the main portion of the lignin degradation products in the effluent have been removed leaving an acid effluent. A fraction of this acid effluent can now be fed back through conduit 21 to precipitator 1 to adjust the pH-value of the incoming effluent. The main portion of acid effluent, however, is fed through conduit 20 from the separator 2 to one or more resin columns which are illustrated in the flow diagram by the column 6.

A phenolic based resin is used for the purification of the effluent in column or columns 6, as described in the German Offenlegungsschrift No. 2,243,141 or U.S. Pat. Application Ser. Nos. 230722 and 301088 , now abandoned in favor of application Ser. No. 491,668.

The expression "phenolic based resin" herein refers to phenolic derivatives, preferably a resin obtained by condensation of phenol with an aldehyde, preferably formaldehyde. Preferred resins are those having tertiary and/or secondary amino groups which are attached to the phenolic skeleton and are weak base ion exchangers, for example, those resins which are marketed under the trade names DUOLITE A-6 and DUOLITE A-7 by Diamond Shamrock Chemical Company, California, U.S.A. DUULITE A-6 has exchanging groups consisting substantially of tertiary amines, while DUOLITE A-7 has exchanging groups consisting substantially of secondary amines. Resins containing a mixture of tertiary and secondary amino groups are useful as well. Phenolic resins where the only functional groups are the phenolic hydroxy groups e.g. DUOLITE F 30, can also be used. Further information of the above mentioned resins may be obtained from Resinous Products Division, Diamond Shamrock Chemical Company, Redwood City, Cal., U.S.A.

From separator 2, the effluent is introduced into the resin 6 through the conduit 20. Since the effluent is extremely acidic the resin need not be activated in advance but can be activated by the acidic effluent itself. The purified effluent is discharged into receiver 7 or is recirculated to the pulp mill. The phenolic resin can be used as a bed in one or more columns, through which is passed the acid effluent to be purified. Continuous processing is advantageous and for more details of these steps of the purification, attention is directed to the disclosure of the above mentioned patent applications, the disclosure of which is incorporated herein by this reference.

The resin can be washed with water and or with an aqueous $Na_2SO_4$ solution to remove chlorides from the resin prior to elution, as described in the above mentioned patent application. When the resin is saturated with lignin degradation products, it is eluted with sodium hydroxide or with any other suitable alkali. The eluate is brought through conduit 18 to dissolver 3 or to optional evaporator 4 and is finally burnt in the black-liquor recovery unit 5. It can also be recirculated for example to a pulp digester in the pulp mill in question.

The following Example is given to illustrate the invention.

From the first alkali extraction stage in a conventional plant for bleaching sulphate pulp, 1 liter untreated waste water as charged in a glass vessel. The bleaching process sequence was as follows: chlorination ($Cl_2$); extraction with alkali (NaOH); hypochlorite bleaching (NaClO); extraction with alkali (NaOH); and treatment with chlorine dioxide ($ClO_2$). The colour of the water, which is a measure of the content of lignin degradation products, corresponded to 15,000 mg Pt/1. The water had a pH value of about 9. To the water there was added 9 N-$H_2SO_4$ in varying quantities until a precipitate was obtained. The precipitate was separated on filter paper, and the colour of the filtrate was measured. It was found that an addition of 4.5 ml of the 9N acid caused maximum reduction of colour, about 67%. Further addition of acid did not cause any further reduction of colour. Addition of the 4.5 ml of acid lowered the pH value of the effluent to 1.8.

The acidic filtrate was passed through a bed of an ion exchanger containing 50 ml of DUOLITE A-6 resin. Twenty five bed volumes of the filtrate were run through the resin bed. The colour of the effluent which had passed through the resin corresponded to an average value about 100 mg Pt/l, which means a total colour reduction of more than 99%.

The sludge which was separated off on the filter paper was redissolved in alkali. It was shown that only 5 ml 40% NaOH was necessary to dissolve 1 liter sludge, corresponding to an increase in pH-value of about 1. The main portion of the chlorides present in the original effluent followed the filtrate and also passed through the ion exchanger without being absorbed while essentially only organically based chlorine was found in the sludge.

We claim:

1. A process for decolouring an aqueous effluent from the bleaching of sulphate pulp with chlorine or chlorine containing compounds, said effluent containing dark coloured lignin degradation products, said bleaching including at least one alkali extraction stage, which consists essentially of:
   a. mixing the aqueous effluent from at least one alkali extraction stage in the bleaching with a sufficient quantity of at least one acid selected from the group consisting of sulphuric acid, sulphurous acid, sulphur dioxide and hydrochloric acid to reduce the pH of the effluent to a value not exceeding about 2 thereby forming a precipitate, said precipitate consisting essentially of dark coloured lignin degradation products and other organic material,
   b. separating the acidic aqueous effluent from the precipitate,
   c. dissolving the precipitate which has been separated, by bringing the precipitate into contact with an alkaline solution, said solution being at least partly black liquor from the sulphate pulp process and
   d. passing the acidic aqueous effluent which has been separated from the precipitate through a bed of particulate phenolic anion exchange resin having pendant amino groups which are substantially only secondary and/or tertiary amino groups which resin is activated by the acidic effluent, said activated resin binding the residual dark coloured lignin degradation products, and separating a decoloured effluent from the loaded resin bed.

2. A process according to claim 1 wherein at least a part of the dissolved precipitate from step (c) is recycled to the sulphate pulp process.

3. A process according to claim 1 wherein at least a part of the dissolved precipitate from step (c) is burnt in a black liquor recovery unit.

4. A process according to claim 1 wherein the acid used in step (a) is an aqueous solution of sulphur dioxide which contains a salt.

5. A process according to claim 1 wherein the acid used in step (a) is sulphuric acid or hydrochloric acid.

6. A process according to claim 1 wherein separation step (b) is carried out in a centrifugal separator having a sludge room and the precipitate is redissolved in the separator by addition of alkali to the separator.

7. A process according to claim 6 wherein the precipitate is redissolved in the sludge room of the separator.

8. A process according to claim 1 wherein a part of the precipitate from step (b) is fed back to the effluent to adjust the content of lignin degradation products in the effluent prior to precipitation.

9. A process according to claim 1 wherein the effluent treated is the effluent arising from the first alkali extraction step in the bleaching process.

10. A process according to claim 1, wherein the acid used in step (a) is sulphuric acid which is used in an amount sufficient to precipitate a major proportion of dark coloured lignin degradation products contained in the effluent.

11. A process according to claim 1, wherein the loaded resin bed is eluted with aqueous sodium hydroxide solution and the eluate burnt together with the dissolved precipitate from step (c).

* * * * *